3,549,677
Patented Dec. 22, 1970

3,549,677
STANNOUS SALTS OF POLYPHOSPHONIC ACIDS
William J. Griebstein, Mount Healthy, Robert J. Grabenstetter, Colerain Township, Hamilton County, and James S. Widder, Springfield Township, Hamilton County, Ohio, assignors to The Procter & Gamble Company, Cincinnati, Ohio, a corporation of Ohio
No Drawing. Continuation-in-part of application Ser. No. 605,614, Dec. 29, 1966. This application Mar. 10, 1969, Ser. No. 805,852
Int. Cl. A61k 9/00; C07f 7/22
U.S. Cl. 260—429.7        5 Claims

ABSTRACT OF THE DISCLOSURE

Novel stannous salts of certain polyphosphonic acids useful as a source of stable and dental enamel reactive stannous tin and as anticalculus agents for incorporation in oral compositions for caries and calculus prophylaxis.

CROSS-REFERENCE TO RELATED APPLICATIONS

This application is a continuation-in-part of the copending application of William J. Griebstein, Robert J. Grabenstetter and James S. Widder, Ser. No. 605,614, filed Dec. 29, 1966 and now abandoned.

BACKGROUND OF THE INVENTION

By the term "oral composition" as used herein is meant a product which in the ordinary course of usage is not intentionally ingested, but is retained in the oral cavity for a time sufficient to contact substantially all of the dental surfaces. Such products include, for example, dentifrices, mouthwashes, chewing gums, and dental prophylaxis pastes and topical solutions for application in the dental office.

It is known that stannous ions can have a significant effect on the anticariogenic efficacy of oral compositions. For example, a body of scientific literature shows that oral compositions containing stannous ions are substantially more effective in reducing dental caries than similar compositions without stannous ions [J. C. Muhler et al., J.A.D.A. 51,665 (1955).]

One of the problems which has developed in the formulation of stable oral compositions containing stannous tin, especially aqueous compositions, is the propensity of this metal to oxidize to its higher valence state, hydrolyze to stannous hydroxide and/or react with other constituents of the composition to form very stable complexes or highly insoluble compounds. The occurrence of any of the foregoing can render the tin non-reactive with dental enamel. Stannous tin in this non-reactive state is referred to herein as "unavailable."

Various approaches have been used to maintain stannous tin in dental enamel reactive form. For example, Norris et al., U.S. Pat. 2,946,725, granted July 26, 1960, teach the use of a sparingly soluble stannous salt such as stannous pyrophosphate as a "reservoir" of stannous ion in conjunction with a water-soluble stannous salt. As stannous ion derived from the soluble salt reacts with dental enamel or becomes unavailable through hydrolysis, etc., the sparingly soluble stannous salt slowly dissolves to replace the depleted stannous ion. However, the pyrophosphate anion hydrolyzes to orthophosphate on aging with the result that the "reservoir" capacity of stannous pyrophosphate gradually diminishes.

Holliday et al., U.S. Pat. 3,105,789, granted Oct. 1, 1963, disclose an advance over Norris et al. involving the maintenance of dental enamel reactive stannous tin by complexing Sn(II) ion with an aldonic acid to form a water-soluble stannous aldonate. A similar approach to the preservation of stannous tin in a stable and available form is provided by William J. Griebstein in copending U.S. application Ser. No. 546,535, filed May 2, 1966, which teaches the use of stannous complexes of hydroxyethylnitrilodiacetic acid, meta-hydroxy benzoic acid, 1,2,3-propanetricarboxylic acid, itaconic acid, or malic acid for this purpose. These complexes are characterized in their solubility in aqueous solution and the strength of these complexes is such that stannous tin is protected from inactivating influences, yet is not so strong as to prevent reaction with dental enamel. Thus, the Holliday et al. and Griebstein approach to maintenance of stannous tin represents a compromise between stability and reactivity, with the result that the stannous tin derived therefrom is not as available for reaction of dental enamel as would be the case with a less stable complex.

It has now been found that yet another and more effective approach to the maintenance of reactive stannous tin exists which involves the provision of certain sparingly soluble stannous polyphosphonate salts which slowly dissolve to yield weak stannous complexes. These stannous complexes are more reactive with dental enamel than the prior art soluble complexes, yet the anions are more stable to hydrolysis than the pyrophosphate of Norris et al. which results in greater stability on aging. Thus, the advantages of both prior art approaches to maintenance of stannous tin can be realized in the approach herein provided. Moreover, the stannous complexes formed by the stannous salts of this invention interfere with calcium hydroxylapatite crystal growth and thus retard dental calculus formulation.

Accordingly, it is an object of this invention to provide novel stannous compounds for use in oral compositions for caries prophylaxis and calculus retardation.

It is a further object of this invention to provide improved stannous compounds which resist hydrolysis and conversion to inactive species when used in oral compositions for caries prophylaxis.

These and other objects will become apparent from the following description.

DETAILED DESCRIPTION OF THE INVENTION

This invention comprises new and useful stannous salts of polyphosphonic acids of the formulae:

(I) 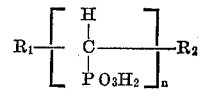

or (II) 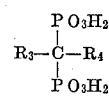

wherein $R_1$ and $R_2$ are each selected from the group consisting of hydrogen and $CH_2OH$; $n$ is an integer of from 3 to 5; $R_3$ is a member selected from the group consisting of hydrogen, halogen (e.g., chlorine, bromine and fluorine), hydroxyl, benzyl, phenylethenyl, aryl (e.g., phenyl and naphthyl), amino —$CH_2PO_3H_2$, —$CH(PO_3H_2)(OH)$, —$CH_2CH(PO_3H_2)_2$, and alkyl, hydroxyalkyl, methoxyalkyl, carboxyalkyl or alkenyl containing from 1 to 14 carbon atoms, and $R_4$ is a member selected from the group consisting of hydrogen, bromine, fluorine, amino, hydroxyl, phenyl, benzyl, —$CH_2PO_3H_2$,

and alkyl, hydroxyalkyl, methoxyalkyl, or carboxyalkyl containing from 1 to 12 carbon atoms.

Polyphosphonic acids of the above Formula I which can be used to prepare the corresponding stannous vicinal polyphosphonates in accordance with this invention include the following:

Propane-1,2,3-triphosphonic acid
Butane-1,2,3,4-tetraphosphonic acid
Pentane-1-hydroxy-2,3,4,5-tetraphosphonic acid
Pentane-1,5-dihydroxy-2,3,4-triphosphonic acid
Pentane-1,2,3,4,5-pentaphosphonic acid.

Propane-1,2,3-triphosphonic acid can be prepared by a process disclosed in the copending U.S. application of D. Allan Nicholson and Darrell Campbell, Ser. No. 694,002, filed Dec. 27, 1967.

Butane-1,2,3,4-tetraphosphonic acid can be prepared by a process disclosed in the copending U.S. application of D. Allan Nicholson and Darrell Campbell, Ser. No. 694,003, filed Dec. 27, 1967.

Pentane-1,2,3,4,5-pentaphosphonic acid and hydroxy-substituted vicinal polyphosphonic acids can be prepared by a process disclosed by D. Allan Nicholson and Darrell Campbell in their copending U.S. application Ser. No. 693,898, filed Dec. 27, 1967.

Polyphosphonic acids encompassed by the above Formula II from which the stannous gem polyphosphonates of this invention are derived include the following:

Ethane-1-hydroxy-1,1-diphosphonic acid
Methanediphosphonic acid
Ethane-1,1,2-triphosphonic acid
Propane-1,1,3,3-tetraphosphonic acid
Ethane-2-phenyl-1,1-diphosphonic acid
Methanephenylhydroxydiphosphonic acid
Methanehydroxydiphosphonic acid
Ethane-2-naphthyl-1,1-diphosphonic acid
Methanephenyldiphosphonic acid
Nonane-5,5-diphosphonic acid
n-Pentane-1,1-diphosphonic acid
Methanedifluorodiphosphonic acid
Methanedibromodiphosphonic acid
Methaneaminodiphosphonic acid
Propane-2,2-diphosphonic acid
Ethane-2-carboxy-1,1-diphosphonic acid
Propane-1-hydroxy-1,1,3-triphosphonic acid
Ethane-1-hydroxy-1,1,2-triphosphonic acid
Ethane-2-hydroxy-1,1,2-triphosphonic acid
Propane-1,3-diphenyl-2,2-diphosphonic acid
Butane-1,1-diphosphonic acid
Nonane-1,1-diphosphonic acid
Pent-4-ene-1-hydroxy-1,1-diphosphonic acid
Octadec-9-ene-1-hydroxy-1,1-diphosphonic acid
3-phenyl-1,1-diphosphono-prop-2-ene
Octane-1,1-diphosphonic acid
Decane-1,1-diphosphonic acid
Dodecane-1,1-diphosphonic acid
Dodecane-2,2-diphosphonic acid Methanehydroxydiphosphonic acid and related compounds encompassed by Formula II above can be prepared by reaction of phosgene with an alkali metal dialkylphosphite. A complete description of these compounds and the method for preparing same is found in U.S. Ptent 3,422,137, granted Jan. 14, 1969.

Methanediphosphonic acid and related compounds of Formula II are described in detail in U.S. Patent 3,213,030, granted Oct. 19, 1965. A preferred method for preparing such compounds is disclosed in U.S. Patent 3,251,907, granted May 17, 1966.

Ethane-1,1,2-triphosphonic acid and related compounds of Formula II can be prepared by the method disclosed by Oscar T. Quimby in copending U.S. application Ser. No. 602,161, filed Dec. 16, 1966.

Propane-1,1,3,3-tetraphosphonic acid and related compounds of Formula II can be prepared by the method disclosed in U.S. Patent 3,400,176, granted Sept. 3, 1968.

Pentane-2,2-diphosphonic acid and related compounds of Formula II can be prepared by a process disclosed by G. M. Kosolopoff in J. Amer. Chem. Soc., 75, 1500 (1953).

Several representative stannous polyphosphonates prepared in accordance with this invention are set forth in the following examples.

Example I

The distannous salt of methanediphosphonic acid was prepared in the following manner: 35.2 g. of 99.8% pure methanediphosphonic acid prepared in accordance with the method set forth in U.S. Patent 3,213,030 were dissolved in 1,000 ml. of oxygen-free distilled water under a nitrogen blanket. 81.0 g. of 93.6% pure $SnCl_2$ (anhydrous) were then dissolved in 750 ml. of oxygen-free distilled water under a nitrogen blanket. The $SnCl_2$ solution was then added to the methanediphosphonic acid solution with vigorous agitation. After three minutes of agitation the precipitate was recovered by filtration through a Buchner funnel under a nitrogen blanket. The precipitate was washed three times with anhydrous acetone, after which the acetone was removed by evaporation. The yield was 76 g. which analyzed as follows:

Theoretical (percent): carbon, 2.93; hydrogen, 0.49; phosphorus, 15.15; stannous tin, 58.0. Found (percent): carbon, 3.2; hydrogen, 1.0; phosphorous, 14.3; stannous tin, 53.6.

Example II

The distannous salt of ethane-1-hydroxy-1,1-diphosphonic acid was prepared as follows: 51.6 g. of ethane-1-hydroxy-1,1-diphosphonic acid (prepared in accordance with the process disclosed in U.S. Patent 3,400,150, granted Sept. 3, 1968) were dissolved in 750 ml. of oxygen-free distilled water, under a nitrogen blanket. 99.4 g. of $SnCl_2$ (anhydrous, 99% pure) moistened with 20 ml. of 12 N HCl were dissolved in 500 ml. of oxygen-free distilled water under a nitrogen blanket.

The $SnCl_2$ solution was added to the ethane-1-hydroxy-1,1-diphosphonic acid solution rapidly and with vigorous agitation. After three minutes of agitation following the addition, the precipitated salt was filtered off using a suction filter, under a nitrogen blanket. The solid was washed three times with dry acetone. Product yield was 57.9 g. which analyzed as follows:

Theoretical (percent): carbon, 5.46; hydrogen, 0.91 phosphorous, 14.1; total Sn, 54.0. Found (percent): carbon, 5.3; hydrogen, 1.2; phosphorous, 12.9; total Sn, 51.4.

Example III

The distannous salt of ethane-1,1-diphosphonic acid is prepared by reacting an aqueous solution of ethane-1,1-diphosphonic acid (prepared in accordance with U.S. Pat. 3,400,150, granted Sept. 3, 1968) with an aqueous solution of $SnCl_2$ as in Examples I and II using a quantity of each sufficient to provide a 2:1 mole ratio of stannous tin to diphosphonic acid.

Stannous salts of each of the polyphosphonic acids set forth in the foregoing disclosure are prepared as in Example I by reacting aqueous solutions of the acid with a quantity of $SnCl_2$ sufficient to provide a mole ratio of stannous tin to polyphosphonic acid of from 2:1 to 5:1, depending on the number of phosphonic acid groups in the compound. 1 mole of stannous tin is employed for each phosphonic acid group in the particular compound. When incorporated in oral compositions at concentrations ranging from 0.01% to 10.0%, by weight, stannous polyphosphonates thus prepared provide a stable and enamel reactive source of stannous tin and materially reduce dental calculus formation.

Oral compositions containing representative compounds of this invention are disclosed in the application of William J. Griebstein et al., entitled "Oral Compositions for Caries Prophylaxis," S.N. 805,853, filed Mar. 10, 1969, and now abandoned, said application being incorporated herein by reference.

What is claimed is:

1. Stannous salts of polyphosphonic acids having the formula:

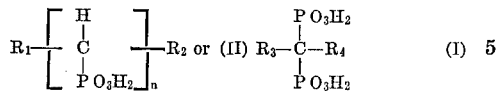

wherein $R_1$ and $R_2$ are each selected from the group consisting of hydrogen and $CH_2OH$; $n$ is an integer of from 3 to 5; $R_3$ is a member selected from the group consisting of hydrogen, halogen, hydroxyl, benzyl, phenylethenyl, amino, $-CH_2PO_3H_2$, $-CH(PO_3H_2)(OH)$,

and alkyl, hydroxyalkyl, methoxyalkyl, carboxyalkyl or alkenyl containing from 1 to 14 carbon atoms, and $R_4$ is a member selected from the group consisting of hydrogen, fluorine, bromine, amino, hydroxyl, benzyl, $-CH_2PO_3H_2$, $-CH_2CH_2PO_3H_2$, and alkyl, hydroxyalkyl, methoxyalkyl, or carboxyalkyl containing from 1 to 12 carbon atoms.

2. Distannous methanediphosphonate.
3. Distannous ethane-1-hydroxy-1,1-diphosphonate.
4. Distannous 3-phenyl-1,1-diphosphono-prop-2-ene.
5. Distannous methanephenylhydroxydiphosphonate.

References Cited

UNITED STATES PATENTS

| | | | |
|---|---|---|---|
| 3,213,129 | 10/1965 | Berth et al. | 260—502.4 |
| 3,394,083 | 7/1968 | Yu Shen | 260—502.4X |
| 3,463,835 | 8/1969 | Budnick | 260—429.7X |

TOBIAS E. LEVOW, Primary Examiner

W. F. W. BELLAMY, Assistant Examiner

U.S. Cl. X.R.

424—48, 49